United States Patent
Gareau et al.

(10) Patent No.: US 10,868,662 B2
(45) Date of Patent: Dec. 15, 2020

(54) VIRTUALIZED SYNCHRONOUS ETHERNET INTERFACES

(71) Applicant: Ciena Corporation, Hanover, MD (US)

(72) Inventors: Sebastien Gareau, Ottawa (CA);
Daniel Claude Perras, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/205,435

(22) Filed: Nov. 30, 2018

(65) Prior Publication Data

US 2020/0177361 A1    Jun. 4, 2020

(51) Int. Cl.
*H04L 7/033* (2006.01)
*H04J 3/06* (2006.01)

(52) U.S. Cl.
CPC .......... *H04L 7/0331* (2013.01); *H04J 3/0658* (2013.01)

(58) Field of Classification Search
CPC .............................. H04L 7/0331; H04J 3/0658
USPC ........................................................ 370/503
See application file for complete search history.

(56) References Cited

U.S. PATENT DOCUMENTS

| | | | | |
|---|---|---|---|---|
| 5,968,197 A | * | 10/1999 | Doiron | H04L 1/188 714/748 |
| 2010/0118894 A1 | * | 5/2010 | Aweya | G06F 1/0328 370/503 |
| 2013/0107897 A1 | | 5/2013 | Bui et al. | |
| 2013/0121705 A1 | * | 5/2013 | Le Pallec | H04L 7/0075 398/155 |
| 2017/0005949 A1 | * | 1/2017 | Gareau | H04L 12/413 |
| 2018/0167160 A1 | | 6/2018 | Gareau et al. | |

(Continued)

FOREIGN PATENT DOCUMENTS

| EP | 2779490 A2 | 9/2014 |
|---|---|---|
| EP | 3113502 A1 | 1/2017 |

OTHER PUBLICATIONS

DEMO: SDN-based Network Slicing in C-RAN; Salvatore Costanzo, Ilhem Fajjari, Nadjib Aitsaadi and Rami Langar;Orange-Labs, F-92320 Ch^atillon, France. Date of Conference: Jan. 12-15, 2018 (Year: 2018).*

(Continued)

*Primary Examiner* — Hassan A Phillips
*Assistant Examiner* — Mohammed S Chowdhury
(74) *Attorney, Agent, or Firm* — Clements Bernard Walker; Lawrence A. Baratta, Jr.; Christopher L. Bernard

(57) ABSTRACT

Virtualized Synchronous Ethernet systems and methods include, in a network element supporting a plurality of slices over a common Ethernet physical (PHY) connection, determining a common PHY frequency; for a specific slice of the plurality of slices, obtaining a bit-level accurate count ($C_n$) over a accumulation window; and determining a client clock for the specific slice based on the common PHY frequency and the bit-level accurate count ($C_n$). The systems and methods can include receiving the bit-level accurate count ($C_n$) from a second network element for synchronization therewith. The bit-level accurate count ($C_n$) over the given accumulation window can be determined utilizing accumulators and the client clock can be determined utilizing Digital Phase Lock Loops (DPLLs).

12 Claims, 6 Drawing Sheets

(56) References Cited

U.S. PATENT DOCUMENTS

2018/0375603 A1* 12/2018 Mayer .................. H04J 3/0652
2019/0140861 A1* 5/2019 Zhong .................. H04L 12/413
2020/0145119 A1* 5/2020 Li ........................ H04J 3/1664
2020/0322077 A1* 10/2020 Du ........................ H04L 49/357

OTHER PUBLICATIONS

Implementing Synchronous Ethernet in Telecommunication Systems; James Aweya, Senior Member, IEEE (Year: 2014).*
On the Efficiency of Flexible Ethernet Client Architectures in Optical Transport Networks; António Eira, André Pereira, João Pires, and João Pedro. (Year: 2018).*
International Telecommunication Union, ITU-T G.8261/Y.1361, Timing and synchronization aspects in packet networks, Aug. 2013, pp. 1-116.
International Telecommunication Union, ITU-T G.8262/Y.1362, Timing characteristics of synchronous Ethernet equipment slave clock, Jan. 2015, pp. 1-38.
International Telecommunication Union, ITU-T G.8264/Y.1364, Distribution of timing information through packet networks, Aug. 2017, pp. 1-42.
International Telecommunication Union, ITU-T G.8275.1/Y.1369.1, Precision time protocol telecom profile for phase/time synchronization with full timing support from the network, Jun. 2016, pp. 1-56.
Nov. 29, 2019, International Search Report and Written Opinion for International Application No. PCT/US2019/056032.

* cited by examiner

VIRTUALIZED SYNCHRONOUS ETHERNET INTERFACES

FIELD OF THE DISCLOSURE

The present disclosure generally relates to networking systems and methods. More particularly, the present disclosure relates to Virtualized Synchronous Ethernet interfaces for implementing multiple Synchronous Ethernet domains on the same interface.

BACKGROUND OF THE DISCLOSURE

The ability to distribute timing between network devices is a critical function in networking, especially in the application of wireless hauling (fronthaul, midhaul and backhaul). Synchronous Ethernet, also referred to as SyncE, is an ITU-T standard for transferring clock signals over the Ethernet Physical layer (PHY). Some relevant standards include ITU-T Rec. G.8261 "Timing and synchronization aspects in packet networks" (August 2013), G.8262 "Timing characteristics of a synchronous Ethernet equipment slave clock" (January 2015), G.8264 "Distribution of timing information through packet networks" (August 2017), G.8275.1 "Precision time protocol telecom profile for phase/time synchronization with full timing support from the network" (June 2016), IEEE 1588v2 "Standard for a Precision Clock Synchronization Protocol for Networked Measurement and Control Systems" (March 2008), and RFC 5905 "Network Time Protocol Version 4: Protocol and Algorithms Specification" (June 2010), the contents of each are incorporated by reference herein. IEEE 1588v2 is referred to as Precision Time Protocol (PTP) and is a well-known timing transfer scheme that is used for the timing plane of enhanced Common Public Radio Interface (eCPRI) and new 5G mobile networks.

5G is more than a set of standards for next-generation wireless networking. Rather, 5G includes aspects of wireless and wireline network integration. One key aspect of 5G is network slicing which allows operators to split a single physical network into multiple virtual networks. Thus, operators deploy one single physical infrastructure and partition networks virtually using network slicing. Network slicing technology enables operators to provide networks on an as-a-service service basis, which enhances operational efficiency while reducing time-to-market for new services. A network slice could span across multiple parts of the network (e.g., terminal, access network, core network, and transport network) and could also be deployed across multiple operators. A network slice includes dedicated and/or shared resources, e.g., in terms of processing power, storage, and bandwidth and has isolation from the other network slices. Slice types could be defined from a functional, operational, or behavioral perspective.

Some approaches to network slicing break the current techniques for timing distribution using Synchronous Ethernet as network slices are virtualized portions of a physical interface.

BRIEF SUMMARY OF THE DISCLOSURE

In an embodiment, a Virtualized Synchronous Ethernet method includes, in a network element supporting a plurality of slices over a common Ethernet physical (PHY) connection, determining a common PHY frequency; for a specific slice of the plurality of slices, obtaining a bit-level accurate count ($C_n$) for the specific slice over an accumulation window; and determining a client clock for the specific slice based on the common PHY frequency reference and the bit-level accurate count ($C_n$). The Virtualized Synchronous Ethernet method can further include receiving the bit-level accurate count ($C_n$) from a second network element for synchronization therewith. The receiving can be via dedicated Ethernet packets. The receiving can be via one of Ethernet Synchronization Messaging Channel (ESMC) packets and Continuity Check Messages (CCMs). The receiving can be via Flexible Ethernet (FlexE) overhead. The receiving can be via appending an Type-Length-Value (TLV). The Virtualized Synchronous Ethernet method can further include protecting the receiving the bit-level accurate count ($C_n$) from the second network element via one or more of repeating transmission, utilizing an incrementing field, and utilizing an acknowledgment scheme. The bit-level accurate count ($C_n$) over the accumulation window can be determined utilizing accumulators and the determining is via Digital Phase Lock Loops (DPLLs). The accumulation window can have a value based on one or more of a bandwidth of the DPLLs and a sampling rate of the accumulators.

In another embodiment, a Virtualized Synchronous Ethernet system includes circuitry configured to receive a common Ethernet physical (PHY) connection which includes a plurality of slices; circuitry configured to determine a common PHY frequency; circuitry configured to obtain, for a specific slice of the plurality of slices, a bit-level accurate count ($C_n$) over an accumulation window; and circuitry configured to determine a client clock for the specific slice based on the common PHY frequency reference and the bit-level accurate count ($C_n$). The Virtualized Synchronous Ethernet system can further include circuitry configured to receive the bit-level accurate count ($C_n$) from a second network element for synchronization therewith. The circuitry configured to receive can utilize one of dedicated Ethernet packets, Ethernet Synchronization Messaging Channel (ESMC) packets, Continuity Check Messages (CCMs), and Flexible Ethernet (FlexE) overhead. The Virtualized Synchronous Ethernet system of claim 11, wherein the circuitry configured to receive can utilize a Type-Length-Value (TLV). The Virtualized Synchronous Ethernet system can further include circuitry configured to protect reception of the bit-level accurate count ($C_n$) to the second network element via one or more of repeating transmission, utilizing an incrementing field, and utilized an acknowledgment scheme. The bit-level accurate count ($C_n$) over the given accumulation window can be determined utilizing accumulators and the client clock is determined utilizing Digital Phase Lock Loops (DPLLs).

In a further embodiment, a network element includes one or more ports configured to receive a common Ethernet physical (PHY) connection which includes a plurality of slices; a switching fabric interconnecting the one or more ports; and a controller configured to determine a common PHY frequency, obtain, for a specific slice of the plurality of slices, a bit-level accurate count ($C_n$) over an accumulation window, and determine a client clock for the specific slice based on the common PHY frequency and the bit-level accurate count ($C_n$). The bit-level accurate count ($C_n$) can be received from a second network element for synchronization therewith. The bit-level accurate count ($C_n$) can be obtained via one of dedicated Ethernet packets, Ethernet Synchronization Messaging Channel (ESMC) packets, Continuity Check Messages (CCMs), and Flexible Ethernet (FlexE) overhead. The bit-level accurate count ($C_n$) can be obtained via an appended Type-Length-Value (TLV). The bit-level accurate count ($C_n$) over the given accumulation window can be determined utilizing accumulators and the client clock is determined utilizing Digital Phase Lock Loops (DPLLs).

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to Virtualized Synchronous Ethernet (SyncE) for implementing multiple Synchronous Ethernet timing domains on the same physical interface, such as using networking slicing. The virtualized Synchronous Ethernet domain utilizes existing interface technologies and slicing techniques. Further, the virtualized Synchronous Ethernet domain operates similar to Synchronous Ethernet where it is unidirectional, not affected by PDV, and not affected by asymmetry introduced by optical fiber or (coherent) optical modules. The present disclosure creates multiple Synchronous Ethernet domains (i.e., Virtualized Synchronous Ethernet) using a single shared physical interface. The interface can be based on normal Ethernet or Flexible Ethernet (FlexE). The virtual SyncE domains can be Virtual Local Area Networks (VLANs), other Layer 2 (L2) or Layer 3 (L3) slicing schemes, or FlexE clients.

Synchronous Ethernet

Figure 1:
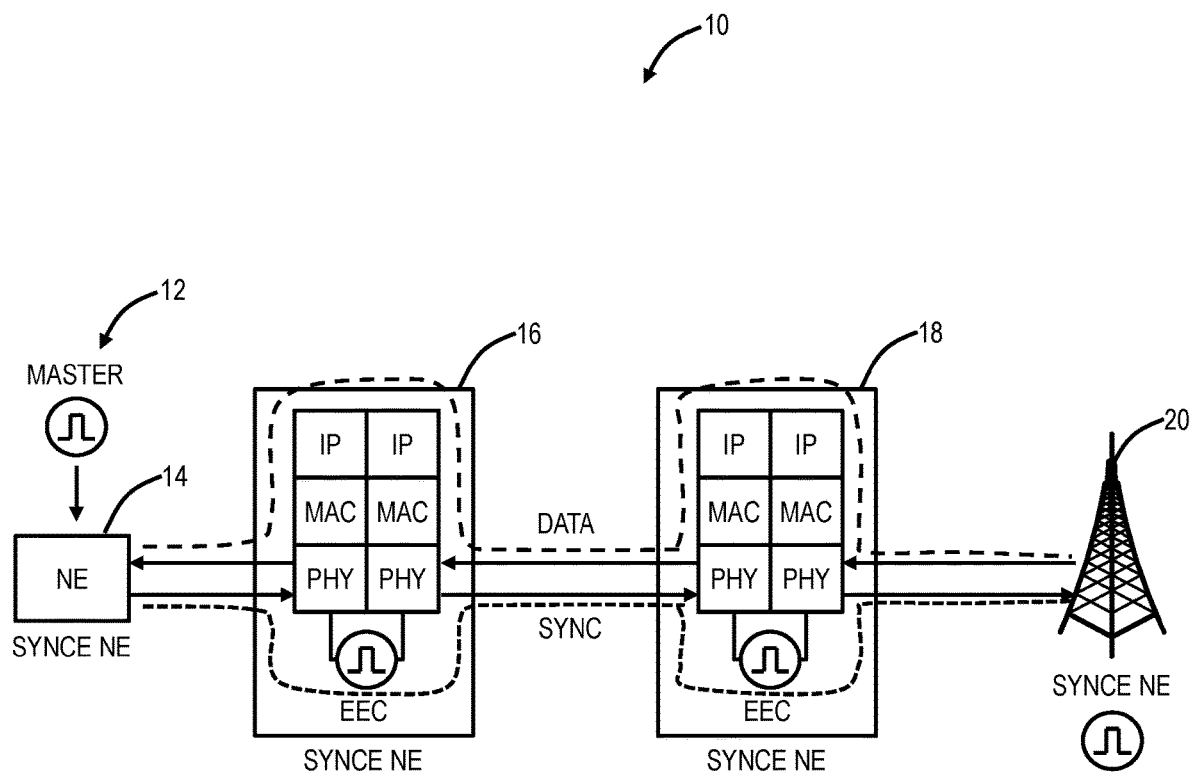
FIG. 1 is a diagram of a network illustrating Synchronous Ethernet (SyncE)

FIG. 1 is a network diagram of a network 10 illustrating Synchronous Ethernet (SyncE). Again, Synchronous Ethernet (or SyncE) enables the transfer of clock signals (frequency) over the Ethernet physical layer. In the example of FIG. 1, there is a master clock 12 at a network element 14 and timing is provided between two SyncE network elements 16, 18 to a wireless network element 20. The aim of Synchronous Ethernet is to provide a synchronization signal from the master clock 12 to the slave network elements 14, 16, 18, 20. The Synchronous Ethernet signal is transmitted over the Ethernet physical layer and can be traceable to an external clock, i.e., the master clock 12. Applications include cellular networks, access technologies such as Ethernet Passive Optical Network (PON), and applications such as Internet Protocol Television (IPTV) or Voice over IP (VoIP).

SyncE was standardized by the ITU-T, in cooperation with IEEE, as three recommendations. ITU-T Rec. G.8261 that defines aspects about the architecture and the wander performance of SyncE networks; ITU-T Rec. G.8262 that specifies Synchronous Ethernet clocks for SyncE; and ITU-T Rec. G.8264 that describes the specification of Ethernet Synchronization Messaging Channel (ESMC). The SyncE architecture minimally requires replacement of the internal clock of an Ethernet card by a Phase Locked Loop (PLL) in order to feed the Ethernet PHY. The ESMC protocol includes the standard Ethernet header for a slow protocol, an ITU-T specific header, a flag field, and a Type Length Value (TLV) structure. The Synchronization Status Message (SSM) encoded within the TLV is a four-bit field whose meaning is described in ITU-T G.781.

ITU-T G.8262 defines Synchronous Ethernet clocks compatible with Synchronous Digital Hierarchy (SDH) clocks. Synchronous Ethernet clocks, based on ITU-T G.813 clocks, are defined in terms of accuracy, noise transfer, holdover performance, noise tolerance, and noise generation. These clocks are referred to as Ethernet Equipment Slave clocks (EEC). While the IEEE 802.3 standard specifies Ethernet clocks to be within ±100 ppm, EECs accuracy must be within ±4.6 ppm. In addition, by timing the Ethernet clock, it is possible to achieve Primary Reference Clock (PRC) traceability at the interfaces. G.8262/Y.1362 is an ITU-T recommendation for Synchronous Ethernet that defines "timing characteristics of synchronous Ethernet equipment slave clock (EEC).

Network Slicing and SyncE

Figure 2:
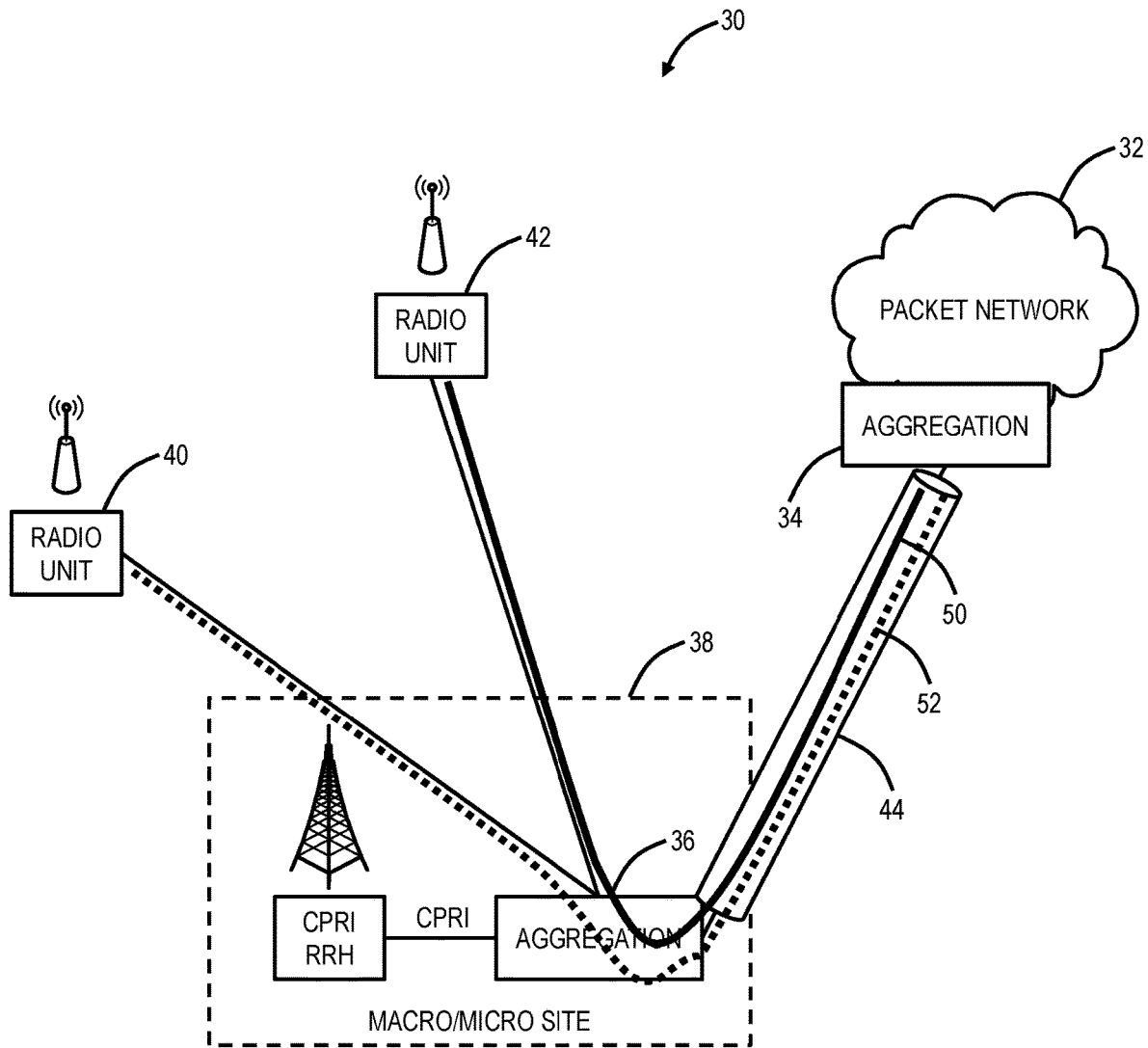
FIG. 2 is a diagram of a network illustrating network slicing.

FIG. 2 is a diagram of a network 30 illustrating network slicing. The network 30 includes a packet network 32 with an aggregation network element 34 connected to another aggregation network element 36 at a radio site 38. The aggregation network element 36 connects to radio units 40, 42 at other radio sites. The connection between the aggregation network elements 34, 36 includes a physical connection 44 which has multiple slices for traffic from the packet network 32 to the radio site 38 and to the radio units 40, 42. As 5G mobile access networks converge and utilize slicing to share a common infrastructure between operators or applications, the concept of timing domains is challenging. There are other applications for which the systems and methods described herein are also applicable, such as Internet of Things (IoT) or Industrial (sensor networks) where timing distribution is needed, but the foregoing description focuses on the 5G mobile use case for illustration purposes.

New Open Radio Access Network (ORAN) architectures are introducing the concept of slicing to carry multiple applications, services or mobile operators on shared infrastructure. In some scenarios, for example, multiple mobile operators sharing common infrastructure from a wholesale supplier, there is a need to keep the operators separate. Slicing is a big topic in this field to isolate various applications (e.g., enhanced Mobile Broadband (eMBB) versus ultra-Reliable Low Latency (uRLLC)), services (e.g., mobile versus Private Line (PL) business) and operators; hard slicing can be based on Metro Transport Network (G.mtn) (i.e., FlexE switching) or can be based on known techniques such as VLANs or Label Switched Paths (LSPs). The challenge is that these slicing techniques break current techniques for timing distribution using SyncE since they are packet based or utilize asynchronous idle mapped procedures (i.e., FlexE).

In the network 30, the radio units 40, 42 can be different operators that operate their F1 interface (mid haul) on a shared Ethernet interface over the physical connection 44. The systems and methods described herein allow slicing schemes to be used allowing each operator to distribute their own Virtualized Synchronous Ethernet (vSyncE) timing to their radios.

For example, the physical connection 44 can be an Ethernet or FlexE connection, e.g., 10 GbE, 100 GbE, 400 GbE, etc. In this example, there are two slices 50, 52 over the physical connection 44. The slice 50 is between the aggregation network element 34 and the radio unit 42, and the slice 52 is between the aggregation network element 34 and the radio unit 40.

Virtualized Synchronous Ethernet (vSyncE)

Figure 3:
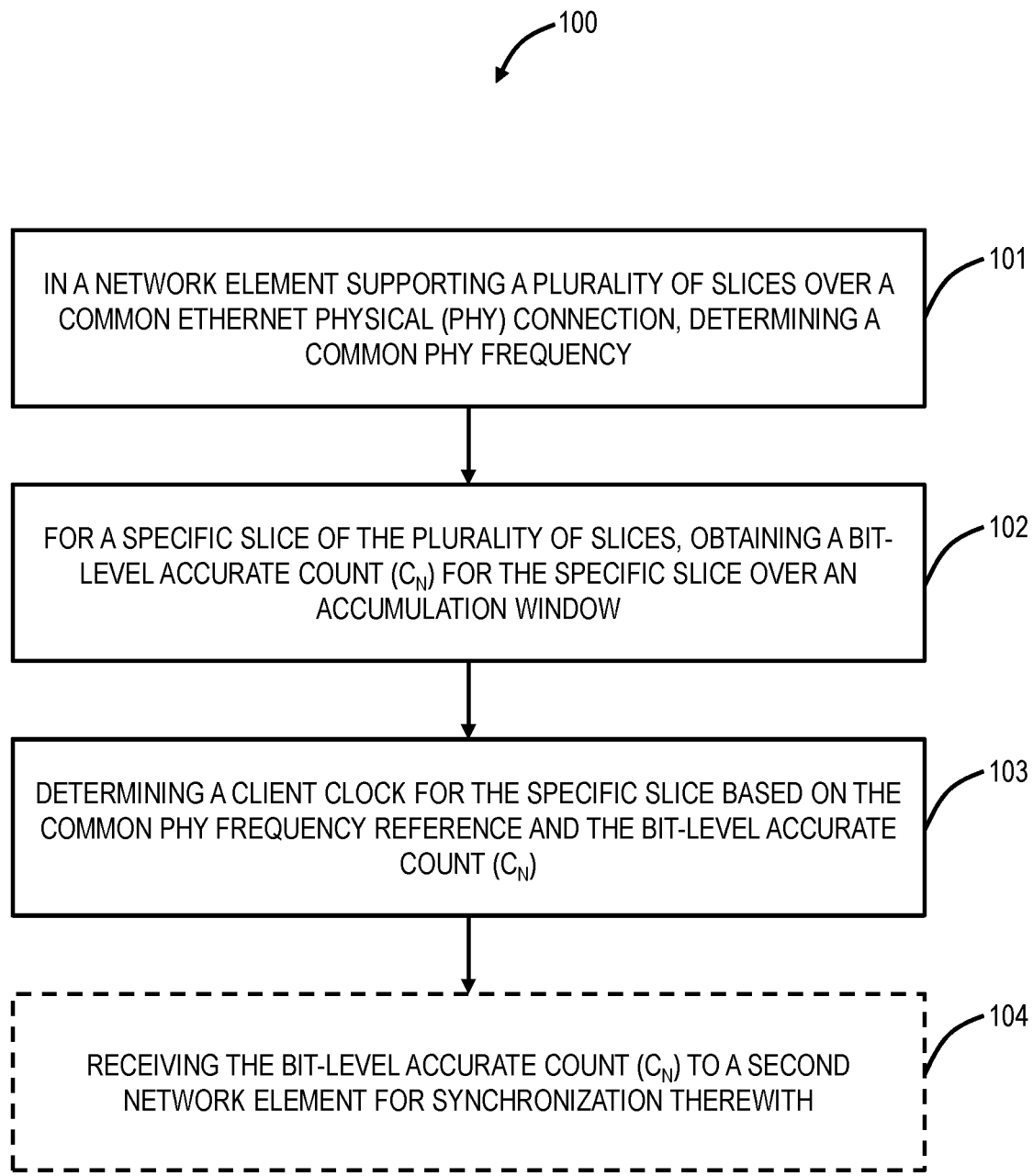
FIG. 3 is a flowchart of a Virtualized Synchronous Ethernet process.

FIG. 3 is a flowchart of a Virtualized Synchronous Ethernet process 100. The Virtualized Synchronous Ethernet process 100 augments current SyncE schemes with out of band timing information for the virtual domains/slices. The Virtualized Synchronous Ethernet process 100 includes, in a network element supporting a plurality of slices over a common Ethernet physical (PHY) connection, determining a common PHY frequency (step 101). The common PHY frequency can be the frequency of the physical connection 44, e.g., 10 Gb/s, 100 Gb/s, etc.

The Virtualized Synchronous Ethernet process 100 includes, for a specific slice of the plurality of slices, obtaining a bit-level accurate count ($C_n$) for the specific slice over an accumulation window step 102). For example, this can include accumulators and Digital Phase Lock Loops (DPLLs) and the accumulators can count the number of bits for the associated slice that are received. This is performed over an accumulation window which can be 100-200 μs measured with the common PHY frequency 208. This value, $C_n$, represents the slice's physical layer frequency (e.g., 218 and 220). $C_n$ can be communicated to a far end DPLL. The DPLLs can count the number of bits for the associated slice that are transmitted and compare this to the received value, $C_n$. The DPLL can then control its output frequency such that the difference between the number of bits transmitted and $C_n$ is minimized, thus recovering the slice's physical layer frequency (e.g., 226 and 228).

The Virtualized Synchronous Ethernet process 100 includes determining a client clock for the specific slice based on the common PHY frequency reference and the bit-level accurate count ($C_n$) (step 103). The Virtualized Synchronous Ethernet process 100 can further include receiving the bit-level accurate count ($C_n$) from a second network element for synchronization therewith, such as via dedicated packets, ESMC messages, and/or overhead (step 104). For soft slicing schemes such as VLANs, this $C_n$ count can be communicated in dedicated packets, or via ESMC messages already used for SyncE (e.g., appended in a TLV). ESMC messages can be sent once per second. Alternatively, the communication can use a Connectivity Fault Management (CFM) protocol such as Continuity Check Messages (CCMs), e.g., appending the bit-level accurate count ($C_n$) in a TLV in a CMM. The accumulation window can be based on the ESMC occurrence but still use a fixed window size. Specifically, the accumulation window is fixed and can be set based on transmission of the bit-level accurate count ($C_n$), i.e., a frequency of the communication of the bit-level accurate count ($C_n$). The PDV will not have any effect since the window size can still be fixed and known. For hard slicing schemes such as FlexE/SPN, the $C_n$ count can also be communicated in dedicated packets or ESMC as stated above. An additional option could be to use FlexE overhead to communicate a FlexE clients' (here being a slice) $C_n$ timing value. Of note, the Virtualized Synchronous Ethernet process 100 may have steps performed at one or both of the network element and the second network element.

Hard slicing refers to the provision of resources in such a way that they are dedicated to a specific Network Slice Instance (NSI). Data-plane resources are provided in the data-plane through the allocation of a optical wavelength or through the allocation of a time domain multiplexed resource such as a FlexE channel. Soft slicing refers to the provision of resources in such a way that whilst the slices are separated such that they cannot statically interfere with each other (one cannot receive the others packets or observe or interfere with the other's storage), they can interact dynamically (one may find the other is sending a packet just when it wants to, or the other may be using CPU cycles just when the other needs to process some information), which means they may compete for some particular resource at some specific time. Soft slicing is achieved through logically multiplexing the data-plane over a physical channel include various types of the tunnel (IP or MPLS) or various types of pseudo-wire (again IP or MPLS).

The Virtualized Synchronous Ethernet process 100 includes determining a client clock based on the PHY frequency and $C_n$ where $C_n$ is a measure of the slice frequency relative to the PHY frequency (step 104). The slice frequency can be determined based on:

$$\text{slice frequency} = PHY \text{ frequency} \cdot \frac{C_n}{\text{\# of bits in the accumulation window}}$$

Note, the slice frequency can be in the transmit direction and in the receive direction (and these values can be different).

The $C_n$ information can be protected using known schemes including repeating the ESMC or timing packet a few times to guarantee its delivery within the accumulation window, using an incrementing field to detect missing $C_n$ values in the receiver, using an acknowledgment scheme to ensure the accumulator does not lose count information, and the like.

Virtualized Synchronous Ethernet (vSyncE) Over an Ethernet Interface

Figure 4:
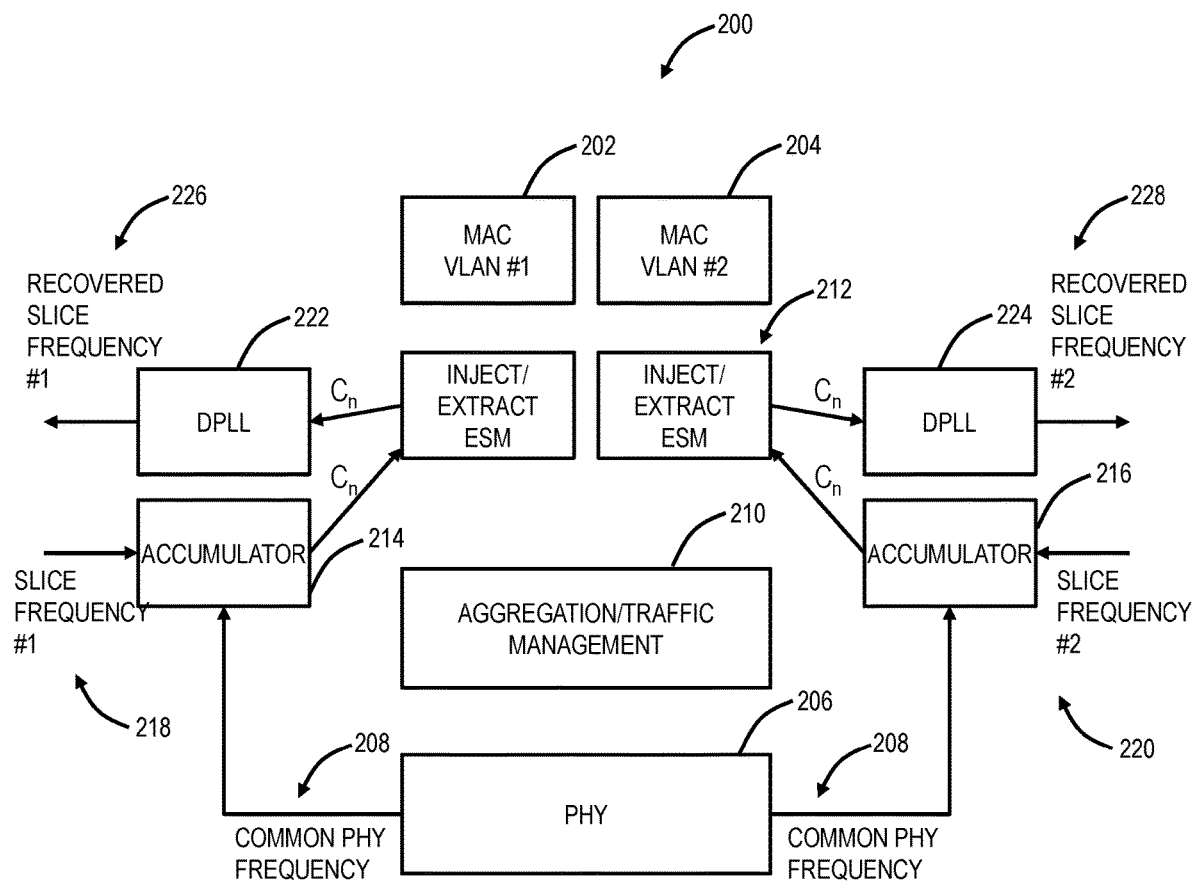
FIG. 4 is a block diagram of an Ethernet system which provides an implementation of the Virtualized Synchronous Ethernet process of FIG. 3 over a standard Ethernet interface, e.g., with Virtual Local Area Networks (VLANs)

FIG. 4 is a block diagram of an Ethernet system 200 which provides an implementation of the Virtualized Synchronous Ethernet process 100 over a standard Ethernet interface, e.g., with Virtual Local Area Networks (VLANs). The Ethernet system 200 can be implemented at a network element via circuitry. In this example, the Ethernet system 200 includes two VLANs #1, #2 202, 204 which operate over a common PHY 206. The common PHY 206 has a common frequency 208. The Ethernet system 200 includes aggregation and traffic management circuitry 210 configured to perform Ethernet processing including injection and extraction of Ethernet Synchronization Messages (ESM) block 212.

The Ethernet system 200 includes an accumulator 214, 216 which monitors the slice frequency 218, 220, respectively, to determine the bit-level accurate count ($C_n$) for the respective VLAN 202, 204. These values are used to recover the transmit slice frequency 218, 220 for the respective VLAN 202, 204 and these values are provided to the block 212 for ESM exchange. The Ethernet system 200 includes DPLLs 222, 224 which receive the respective ESM messages with the bit-level accurate count ($C_n$) for the respective VLAN 202, 204 and output a recovered slice frequency 226, 228 for the respective VLAN 202, 204.

The DPLLs 222, 224 are at the off-ramp and are responsible for recovering the on-ramp client frequency. Being a digital PLL, it operates in discrete time. That is, it operates on discrete phase samples to recreate the client frequency. The accumulators 214, 216 are at the on ramp and configured to produce these phase samples (the $C_n$ information).

The choice of an appropriate accumulation windows size depends on the technique used to recovering the clock at the far end. Again, the DPLLs 222, 224 are used to recover the clock. One such example would be to use DPLL with a 2nd order Low Pass Filter (LPF) response with a bandwidth of 300 Hz. The DPLL sample rate is chosen depending on the desired performance. As an example, one could set the sample rate at 10× the bandwidth, or 3 kHz. Both ends (the DPLL and the accumulator) are configured to use this 3 kHz sampling frequency. Thus, at the accumulator, the window size would be 1/3000=333.33 μs. In this example, one could change the bandwidth of the DPLL or the sampling rate independently to modify the performance of the system. Also, one could use a different type of DPLL or some other clock recovery method (one that is not necessarily modeled as classic PLL) as appropriate.

Thus, the on-ramp process captures the client signal timing information at one node utilizing the accumulators 214, 216 and the off-ramp process uses that timing information to recreate the client signal frequency utilizing the DPLLs 222, 224.

Note, the bit-level accurate count ($C_n$) is not confined to only a count of the number of bits. In practice, one may choose to count bytes, words, etc. which is the intent of the phrase "bit-level accurate count ($C_n$)." That is, the count, $C_n$, is accurate to the bit-level, regardless of the units that the count is expressed in. For example, an implementation could also recover a clock from the bits, then count the clock edges.

Figure 5:
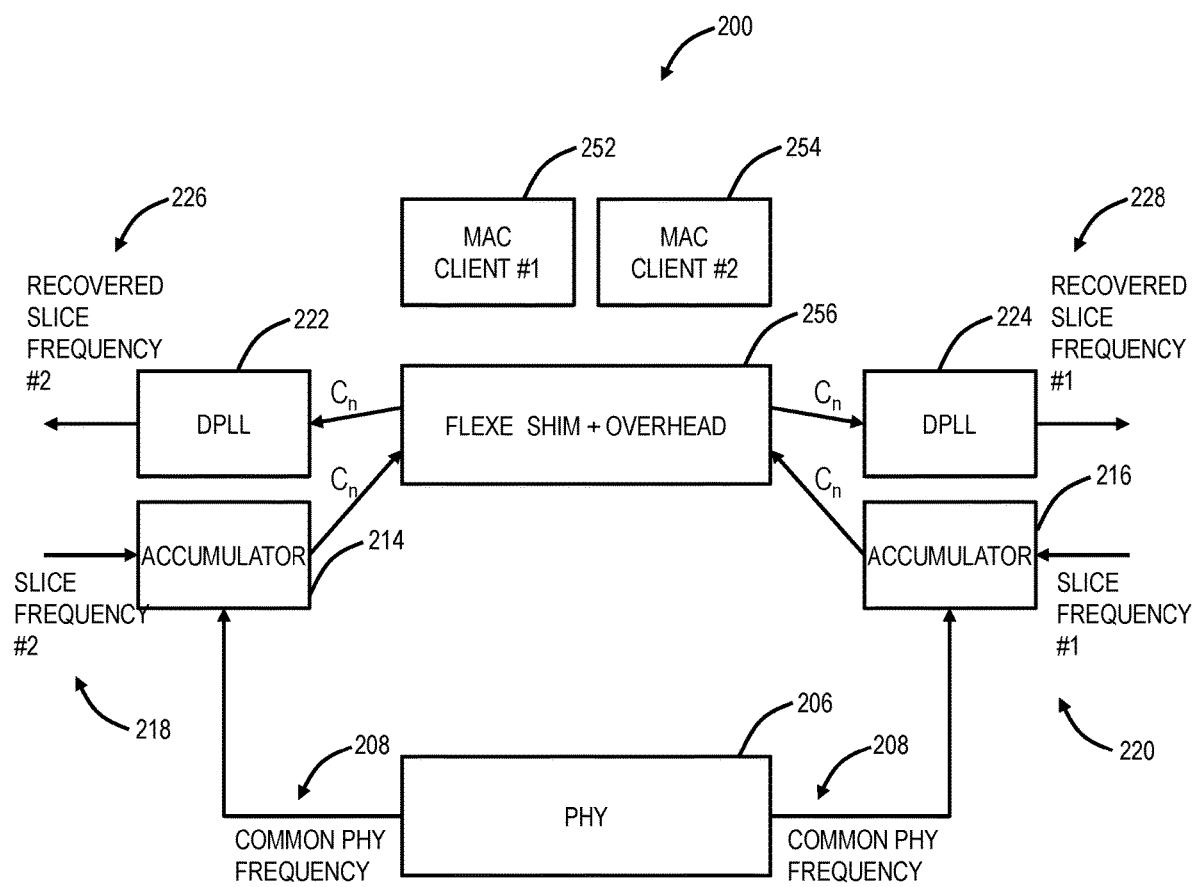
FIG. 5 is a block diagram of an Ethernet system which provides an implementation of the Virtualized Synchronous Ethernet process of FIG. 3 over a FlexE interface.

Of note, the Ethernet system 200 is illustrated with two example VLANs 202, 204. Those of ordinary skill in the art will appreciate this can also include more than two VLANs.
Virtualized Synchronous Ethernet (vSyncE) over a FlexE Interface FIG. 5 is a block diagram of an Ethernet system 250 which provides an implementation of the Virtualized Synchronous Ethernet process 100 over a FlexE interface. The Ethernet system 250 operates similarly to the Ethernet system 200 except using FlexE instead of the standard Ethernet interface.

The Ethernet system 250 can be implemented at a network element via circuitry. In this example, the Ethernet system 250 includes two FlexE MAC clients #1, #2 252, 254 which operate over a common PHY 206. The common PHY 206 has a common PHY frequency 208. The Ethernet system 250 includes FlexE shim and overhead circuitry 256 configured to perform FlexE processing. FlexE is an implementation agreement from the Optical Internetworking Forum (OIF) described, e.g., in IA #OIF-FLEXE-01.1 Jun. 21, 2017, the contents of which are incorporated by reference herein. The approaches described herein also apply to other techniques such as G.mtn or the like.

Figure 6:
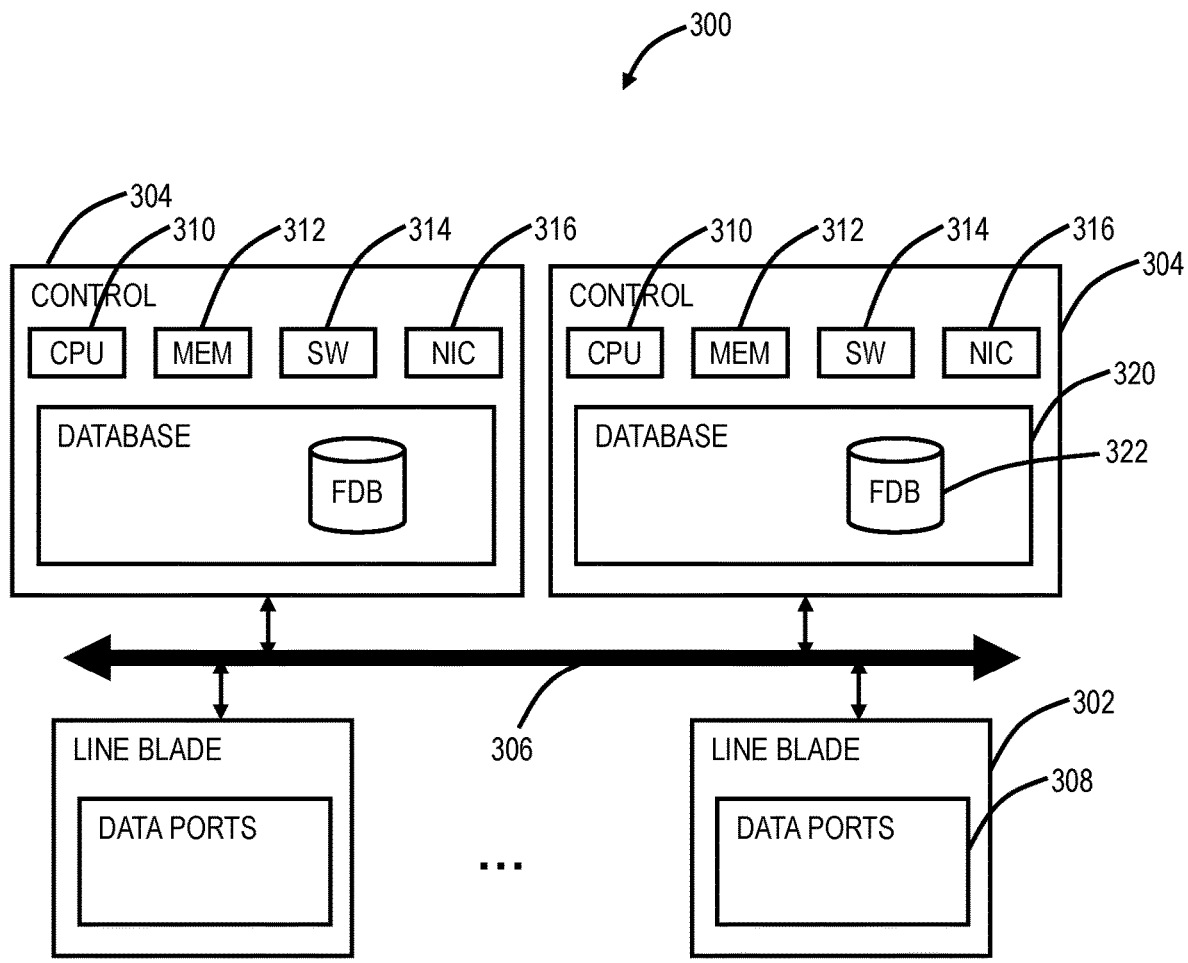
FIG. 6 is a block diagram of an example implementation of a network element.

In the FlexE implementation, the Ethernet system 250 can include the bit-level accurate count ($C_n$) for the respective MAC client 252, 254 in FlexE overhead.
Network Element FIG. 6 is a block diagram of an example implementation of a network element 300. In this embodiment, the network element 300 is an Ethernet network switch, but those of ordinary skill in the art will recognize the systems and methods contemplate operation in other types of network elements and other implementations, such as, for example, a layer two switch integrated within an optical network element. The network element 300 can include the Ethernet system 200, 250. In FIG. 6, the network element 300 includes a plurality of blades 302, 304 interconnected via an interface 306. The blades 302, 304 are also known as line cards, line modules, circuit packs, pluggable modules, etc. and generally refer to components mounted within a chassis, shelf, etc. of a data switching device, i.e., the network element 300. In another embodiment, the functionality of each of the blades 302, 304 may be integrated into a single module, such as in the layer two switch integrated within an optical network element or a single integrated unit, i.e., a "pizza box." Each of the blades 302, 304 may include numerous electronic devices and optical devices mounted on a circuit board along with various interconnect including interfaces to the chassis, shelf, etc.

Two example blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 300 out by the correct port 308 to the next network element. "Switching fabric" includes switching units, or individual boxes, in a node; integrated circuits contained in the switching units; and programming that allows switching paths to be controlled.

The control blades 304 include a microprocessor 310, memory 312, software 314, and a network interface 316 to control packet switching. Specifically, the microprocessor 310, the memory 312, and the software 314 may collectively control, configure, provision, monitor, etc. the network element 300. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this example embodiment, the network element 300 includes two control blades 304 which may operate in a redundant or protected configuration such as 1:1, 1+1, etc.

In general, the control blades 304 maintain dynamic system information including Layer two forwarding databases, protocol state machines, and the operational status of the ports 308 within the network element 300. In an embodiment, the blades 302, 304 are configured to implement the various processes, algorithms, methods, mechanisms, etc. described herein for implementing the Virtualized Synchronous Ethernet process 100.

Those of ordinary skill in the art will recognize the network element 300 can include other components which are omitted for illustration purposes, and that the systems and methods described herein are contemplated for use with a plurality of different network elements with the network element 300 presented as an example type of network element. For example, in some embodiments, the line blades 302 and the control blades 304 can be implemented as a single module. In general, the systems and methods described herein contemplate use with any network element providing packet switching. Furthermore, the network element 300 is merely presented as one example device for the systems and methods described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Virtualized Synchronous Ethernet method comprising:
in a network element supporting a plurality of separate slices over a common Ethernet physical (PHY) connection, each separate slice allowing traffic for a respective application, determining a common PHY frequency that is shared by each of the plurality of separate slices;
for a specific slice of the plurality of separate slices, obtaining a bit-level accurate count $(C_n)$ for the specific slice over an accumulation window from a second network element for synchronization therewith via one of Ethernet Synchronization Messaging Channel (ESMC) packets, dedicated Ethernet packets, Flexible Ethernet (FlexE) overhead, and Continuity Check Messages (CCMs); and
determining a client clock for the specific slice based on the common PHY frequency and the bit-level accurate count $(C_n)$.

2. The Virtualized Synchronous Ethernet method of claim 1, wherein the obtaining of the bit-level accurate count $(C_n)$ is via appending a Type-Length-Value (TLV).

3. The Virtualized Synchronous Ethernet method of claim 1, further comprising
protecting the obtaining of the bit-level accurate count $(C_n)$ from the second network element via one or more of repeating transmission, utilizing an incrementing field, and utilizing an acknowledgment scheme.

4. The Virtualized Synchronous Ethernet method of claim 1, wherein the bit-level accurate count $(C_n)$ over the accumulation window is obtained utilizing accumulators and the determining the client clock is via Digital Phase Lock Loops (DPLLs).

5. The Virtualized Synchronous Ethernet method of claim 4, wherein the accumulation window has a value based on one or more of a bandwidth of the DPLLs and a sampling rate of the accumulators.

6. A Virtualized Synchronous Ethernet system comprising:
circuitry configured to receive a common Ethernet physical (PHY) connection which includes a plurality of separate slices, each separate slice allowing traffic for a respective application;
circuitry configured to determine a common PHY frequency that is shared by each of the plurality of separate slices;
circuitry configured to obtain, for a specific slice of the plurality of separate slices, a bit-level accurate count $(C_n)$ over an accumulation window, wherein the bit-level accurate count $(C_n)$ is obtained from a second network element for synchronization therewith via one of the Ethernet Synchronization Messaging Channel (ESMC) packets, dedicated Ethernet packets, Flexible Ethernet (FlexE) overhead, and Continuity Cheek Messages (CCMs); and
circuitry configured to determine a client clock for the specific slice based on the common PHY frequency and the bit-level accurate count $(C_n)$.

7. The Virtualized Synchronous Ethernet system of claim 6, wherein the bit-level accurate count is obtained via an appended Type-Length-Value (TLV).

8. The Virtualized Synchronous Ethernet system of claim 6, further comprising
circuitry configured to protect reception of the bit-level accurate count $(C_n)$ from the second network element via one or more of repeating transmission, utilizing an incrementing field, and utilizing an acknowledgment scheme.

9. The Virtualized Synchronous Ethernet system of claim 6, wherein the bit-level accurate count $(C_n)$ over the accumulation window is obtained utilizing accumulators and the client clock is determined utilizing Digital Phase Lock Loops (DPLLs).

10. A network element comprising:
one or more ports configured to receive a common Ethernet physical (PHY) connection which includes a plurality of separate slices, each separate slice allowing traffic for a respective application;
a switching fabric interconnecting the one or more ports; and a controller configured to
    determine a common PHY frequency that is shared by each of the plurality of separate slices,
    obtain, for a specific slice of the plurality of separate slices, a bit-level accurate count ($C_n$) over an accumulation window, wherein the bit-level accurate count ($C_n$) is obtained from a second network element for synchronization therewith via one of Ethernet Synchronization Messaging Channel (ESMC) packets, dedicated Ethernet packets, Flexible Ethernet (FlexE) overhead, and Continuity Check Messages (CCMs), and
    determine a client clock for the specific slice based on the common PHY frequency and the bit-level accurate count ($C_n$).

11. The network element of claim 10, wherein the bit-level accurate count ($C_n$) is obtained via an appended Type-Length-Value (TLV).

12. The network element of claim 10, wherein the bit-level accurate count ($C_n$) over the accumulation window is obtained utilizing accumulators and the client clock is determined utilizing Digital Phase Lock Loops (DPLLs).

* * * * *